March 9, 1965 J. A. DYER 3,172,703
DUMP MECHANISM FOR TRUCKS
Filed June 14, 1963 2 Sheets-Sheet 1

INVENTOR.
JOHN A. DYER
BY
*Schermerhorn*
Attorney

March 9, 1965 J. A. DYER 3,172,703
DUMP MECHANISM FOR TRUCKS
Filed June 14, 1963 2 Sheets-Sheet 2

INVENTOR.
JOHN A. DYER
BY
*R. Schermerhorn*
Attorney

United States Patent Office 3,172,703
Patented Mar. 9, 1965

3,172,703
DUMP MECHANISM FOR TRUCKS
John A. Dyer, Eugene, Oreg., assignor to Dyco Inc., Eugene, Oreg., a corporation of Oregon
Filed June 14, 1963, Ser. No. 287,854
5 Claims. (Cl. 298—22)

This invention relates to apparatus for converting a conventional pickup truck into a dump truck.

A pickup truck is generally recognized as a light truck of about one-half or three-quarter ton capacity having a passenger car engine and chassis. It is used extensively for light hauling because it has speed and manueverability comparable to a passenger car. However, the truck body is bolted rigidly to the chassis and the frequent need for a dump body has not been recognized by the motor car manufacturers. Dump mechanisms and conversion equipment heretofore proposed have not been adaptable to the drop frame passenger car type of chassis which is now used on pickup trucks.

Objects of the present invention are, therefore, to provide a dump mechanism to convert a conventional pickup truck to a dump truck, to provide a preassembled apparatus for such purpose, to provide a lift kit which can be used on most conventional pickup trucks, to provide a kit for the purpose described which is easy to install and remove, which doesn't change the truck's appearance, which does not impair the strength or capacity of the original truck, which is essentially self-contained, which operates independently of the vehicle engine, which is of relatively simple and inexpensive construction and which is rugged and reliable in operation.

The present lifting mechanism comprises an essentially preassembled and self-contained apparatus which is particularly adapted for the drop frame type of chassis construction now used on passenger automobiles and pickup trucks. The mechanism is independent of the shape of the frame and will accommodate the variations in shape and dimensions found in conventional pickup trucks. The self-contained assembly assumes the major lifting stresses within itself so that these are not imposed on the vehicle chassis. The lifting mechanism is operated by a single hydraulic cylinder which is supplied by a battery-operated pump. The pump and motor unit may be conveniently mounted under the hood on the vehicle engine without any modification of the original power plant or drive line.

The foregoing and other objects and advantages will become apparent and the invention will be better understood from the following detailed description of the preferred embodiment illustrated in the accompanying drawings. Various changes may be made, however, in the details of construction and arrangement of parts, and all such modifications within the scope of the appended claims are included in the invention.

Figure 1:
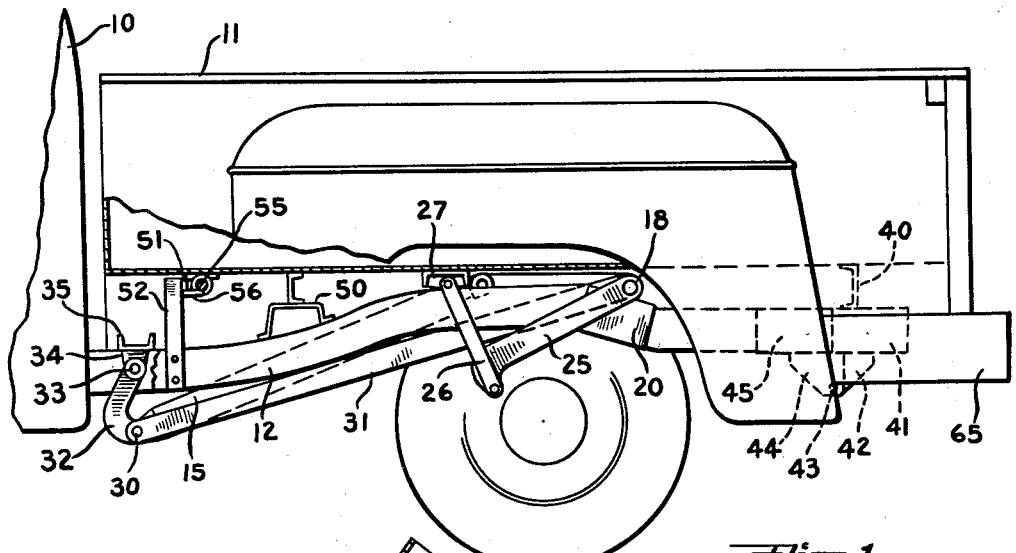
FIGURE 1 is a fragmentary side elevation view of a conventional pickup truck with parts broken away to show a dump mechanism embodying the principles of the invention, with the body in lower position.
Figure 2:
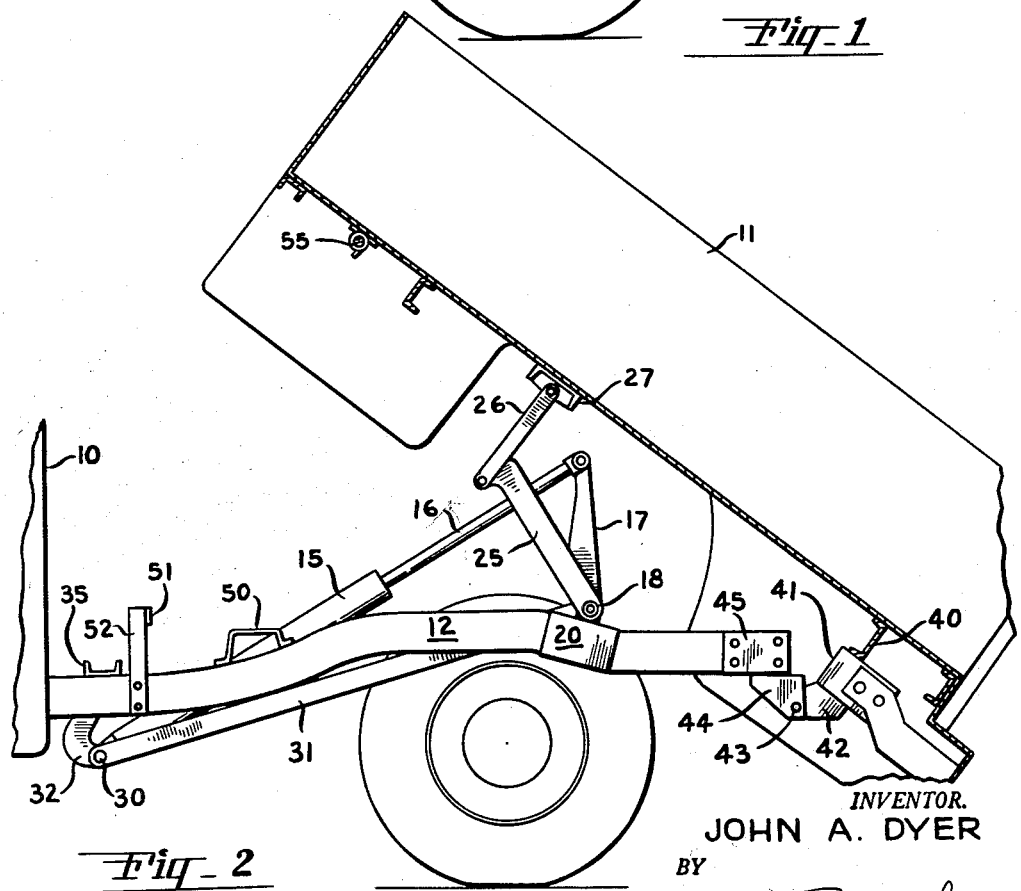
FIGURE 2 is a similar view showing the body in raised position.
Figures 3, 4:
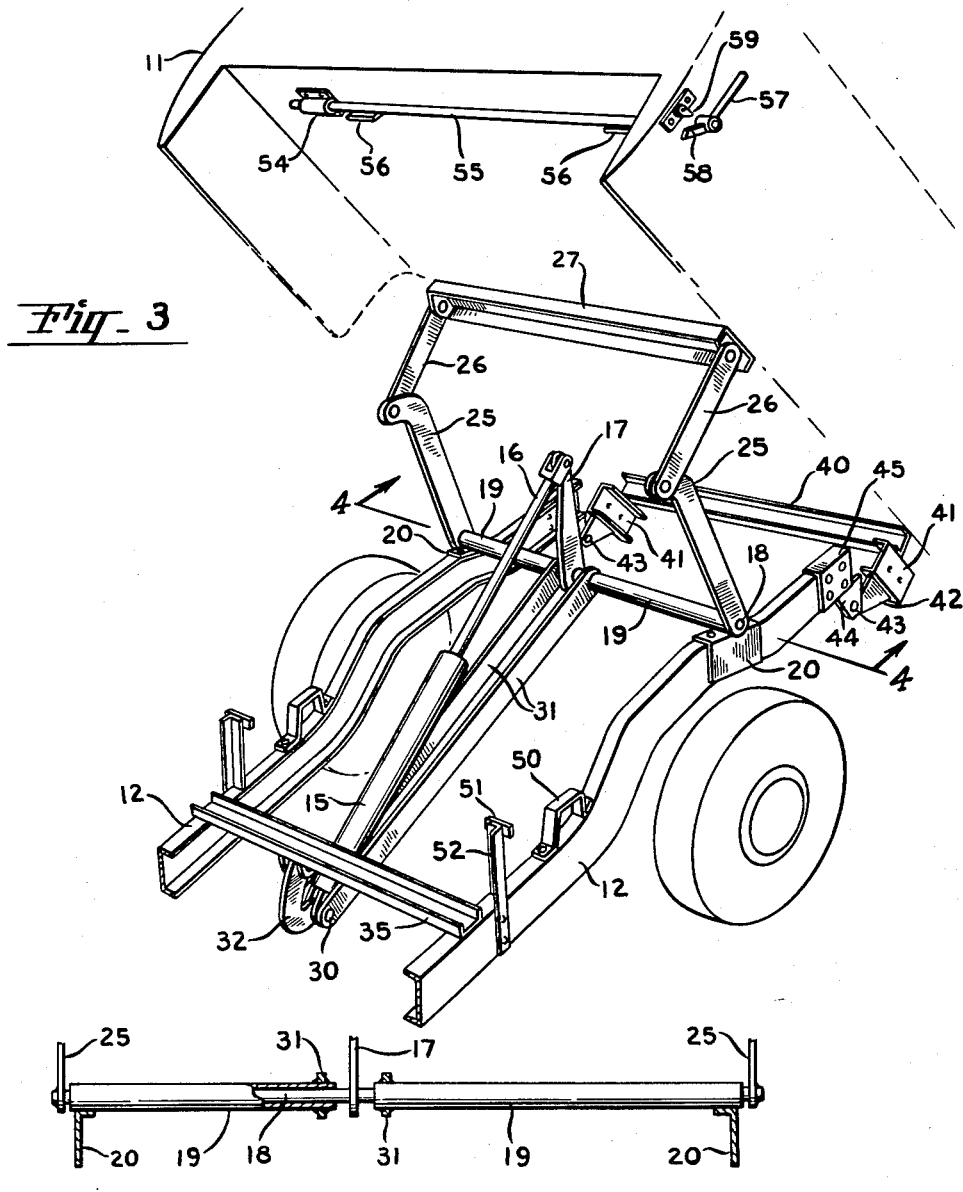
FIGURE 3 is a perspective view of the dumping mechanism in raised position.
FIGURE 4 is a sectional view taken on the line 4—4 of FIGURE 3.

The pickup truck has a conventional cab 10 and pickup body 11 mounted on a drop frame type of chassis having longitudinal side frame members 12. The lifting mechanism is operated by a single acting hydraulic cylinder 15 having a piston rod 16 pivotally connected at its outer end with an arm 17 fixedly connected with the middle of a transverse shaft 18. The shaft 18 is mounted for rotation in a pair of left and right bearing tubes 19 which are fixedly secured at their outer ends to a pair of frame brackets 20. These brackets are adapted to be bolted to either a horizontal or inclined portion of the chassis frame members 12 of the vehicle.

Fixedly mounted on the outer ends of shaft 18 are a pair of lift arms 25 which are pivotally connected at their free ends with the lower ends of links 26. These links are pivotally connected at their upper ends with the ends of a transverse channel member 27 which is adapted to be bolted to the underside of the truck body.

The forward end of cylinder 15 carries a pin 30 in the front ends of a pair of longitudinal thrust reaction arms 31. The rear ends of arms 31 are fixedly connected to the inner ends of tubes 19 on opposite sides of the arm 17. Pin 30 is supported by a curved arm 32 which hangs from a pin 33 in a bracket 34 depending from the underside of a transverse channel bar 35. This bar is adapted to be bolted to the chassis frame members 12.

A transverse channel bar 40 is bolted to the underside of the truck body near its rear end. The ends of this channel bar are rigidly connected with short longitudinal channel sections 41 of size and strength similar to the chassis frame members 12. In order to avoid weakening the chassis frame members 12, the rear ends of the latter are cut off and the channel sections 41 take the place of the cut off parts. Depending from the underside of each channel section 41 is a bracket ear 42 which is pivotally mounted on a hinge pin 43. Hinge pin 43 is carried by depending bracket ears 44 on a bracket member 45 which is adapted to be bolted to the chassis frame member 12 just ahead of the point where the latter was cut off. Hinge pins 43 form the pivot on which the truck body is tilted when it is lifted.

Pads 50 are bolted to the frame members 12 to support the front end of the dump body in its lower position and latching means is provided to hold the front end of the body down against these pads and prevent it from bouncing on a rough road. For the latter purpose, a pair of latch bars 51 are mounted on the upper ends of standards 52 bolted on frame members 12. Bolted to the underside of the front end of the truck body are a pair of bearings 54 for a lock shaft 55. This shaft is equipped with lugs 56 to engage under the latch bars 51.

The shaft is turned by a handle 57 which is equipped with a locking arm 58. Arm 58 is engageable with a spring-actuated locking pawl 59 to hold the shaft in latched position. Clockwise rotation of handle 57 causes the lugs 56 to engage under latch bars 51 and pull the front end of the body down firmly against the pads 50, and pawls 59 hold the parts firmly locked in such position. Reverse rotation of handle 57 causes arm 58 to disengage the pawl 59 and rotates lugs 56 out of engagement with latch bars 51 when the body is to be raised.

Since hanger arm 32 is pivotally suspended from transverse channel bar 35, there is no thrust reaction from cylinder 15 on the channel bar or on chassis frame member 12 and no frame braces are required for the front end of the cylinder. This thrust reaction is taken entirely by the longitudinal thrust reaction arms 31 which are part of the attachment preassembly or kit. In installing the attachment device, it will be observed that no major alterations are made in either the vehicle chassis or the pickup body itself. The necessary connections are made without weakening either the chassis or the body, and the novel hinge construction serves to strengthen rather than weaken the chassis at the hinge point. By incorporating the channel sections 41 into the attachment kit, it is not necessary to do any welding on the vehicle chassis. Also, the various bolted connections do not have to withstand great stresses and so do not require large bolt holes which would weaken the chassis frame members.

Another advantage of the present device is that the rear bumper 65 may be mounted in the conventional way on channel sections 41 and the bumper may be equipped with the usual trailer hitch, if desired. The bumper and trailer hitch are not weakened in any way by the modification of the chassis. Dump mechanisms heretofore proposed required the removal of the rear bumper whereby not only the bumper but, also, the possibility of a trailer hitch was eliminated.

The present dumping mechanism will also operate as a jack. The hinge leverage is such that by placing a block under the rear end of the truck body and then raising the body by the present mechanism, the rear wheels of the vehicle will be lifted off the ground. This is a great convenience to the user of the truck.

The major portion of the present dump mechanism may be manufactured and sold as a preassembled kit. This would include the cylinder and piston rod, thrust reaction arms 31, hanger arm 32, shaft 18 and bearing tubes 19, lift arms 25 and links 26. In installing the mechanism the conventional body 11 is first unbolted and removed from the chassis. The lock shaft 55 is installed and the channel supports 27, 40 and 47 are bolted to the bottom of the truck body.

If desired, the frame brackets 20 may be welded to the bearing tubes 19 but, in some cases, it may be desirable to make these welds at the time of installation since the angular relationship between these brackets and the thrust reaction arms 31 may vary on different vehicles depending upon the shape of the hump in the chassis frame members 12. By reason of the pivotal suspension of the front end of the cylinder, the spacing of brackets 20 from channel bar 35 is not critical and a tolerance of an inch or so in the longitudinal positions of the bolt holes in the frame members for securing these parts is permissible. This greatly simplifies the installation. Finally, the rear ends of frame members 12 are cut off as described and the preassembled parts 41, 43, 45 are connected in place.

Not only is the kit easy to install in the first instance but it is also readily removable and usable on another truck. This is of great convenience to the user when he sells his truck and buys another. After the dump mechanism has been removed, the body may be re-bolted to the chassis as it was originally without any impairment of function or appearance. The cut off rear ends of the side frame members 12 may be bolted or welded back in place or other members substituted for supporting the rear bumper in its original position.

The hydraulic cylinder 15 is preferably supplied from a hydraulic pump and reservoir unit (not shown) which may be conveniently mounted on the engine of the vehicle. The pump is driven by a battery-operated motor in the unit whereby the lift mechanism is functionally independent of the truck engine and does not require a power take-off from the engine drive shaft.

Control is preferably effected by a portable push button switch block on an extension cord which permits operation either from the cab of the truck or any convenient position outside of the truck. Only two push button switches are necessary, one to energize the motor for dumping and one to energize a solenoid valve to relieve hydraulic liquid from the lower end of cylinder 15 into the reservoir. When the cylinder is relieved, the body drops by gravity. Thus, when one push button is actuated the body will lift and when the other is actuated the body will lower. Release of either push button effects a hydraulic lock to hold the body in any desired intermediate position in either upward or downward movement. Such a power source will readily lift and hold in elevated position a load up to one ton in weight, which is far in excess of the usual rated capacity of a conventional lift truck.

Although the hydraulic and control systems are furnished as a part of the conversion kit, they are not illustrated as these components are conventional and are presently available on the market. Their description, however, will aid in understanding the preferred mode of operation of the illustrated mechanism.

Having now described my invention and in what manner the same may be used, what I claim as new and desire to protect by Letters Patent is:

1. A dump truck comprising a pair of vehicle chassis longitudinal side frame members, a dump body pivotally mounted on said chassis, a cross shaft extending between said members, a pair of bearing tubes on said shaft, means mounting the outer end of each bearing tube on one of said members, lift arms on the outer ends of said shaft, links on said arms connected with the dump body, an arm on the center of said shaft between the inner ends of said bearing tubes, a fluid pressure cylinder having a piston rod in one end thereof connected with said center arm, a transverse pin connector on the opposite end of said cylinder, a pair of thrust reaction arms on opposite sides of said cylinder, one end of said reaction arms being connected with said pin and the opposite ends of said arms being connected with the inner ends of said bearing tubes, and means supporting said pin from the chassis.

2. A dump mechanism for a truck having a pair of vehicle chassis longitudinal side frame members, comprising a cross shaft, a pair of bearing tubes on said shaft, means for mounting the outer end of each bearing tube on one of said members, lift arms on the outer ends of said shaft for lifting the truck body, an arm on the center of said shaft between the inner ends of said bearing tubes for rotating the shaft, a fluid pressure cylinder having a piston rod in one end thereof connected with said center arm, a pair of thrust reaction members on opposite sides of said cylinder connected between the inner ends of said bearing tubes and the opposite end of said cylinder, and flexible suspension means for supporting said opposite end of said cylinder from said chassis at different points longitudinally of the chassis relative to said opposite end of the cylinder.

3. A dump mechanism for a truck having a pair of vehicle chassis longitudinal side frame members, comprising a cross shaft, a pair of bearing tubes on said shaft, a frame member mounting bracket on the outer end of each bearing tube, lift arms on the outer ends of said shaft, links on said arms for connection with the truck body, an arm on the center of said shaft between the inner ends of said bearing tubes for rotating the shaft, a fluid pressure cylinder having a piston rod in one end thereof connected with said center arm, a transverse pin connector on the opposite end of said cylinder, a pair of thrust reaction arms on opposite sides of said cylinder, said arms being connected at one end with said pin and at their opposite ends with the inner ends of said bearing tubes, and means for supporting said pin from the chassis.

4. A dump mechanism as defined in claim 3, said pin supporting means comprising a hanger arm having pivotal connection on one end with said pin and having pivotal means on its other end for connection with the vehicle chassis.

5. A pre-assembled dump mechanism for a truck having a dump body pivotally mounted on a vehicle chassis with longitudinal side frame members, said mechanism comprising a cross shaft, a pair of bearing tubes on said shaft, each bearing tube extending from a point near one end of the shaft to a point near the center of the shaft, a frame member mounting bracket on the outer end of each bearing tube, lift arms on the outer ends of said shaft, links on said arms for connection with said dump body, an arm on the center of said shaft between the inner ends of said bearing tubes for rotating the shaft, a longitudinal fluid presure cylinder having a piston rod in its rear end connected with said center arm, a transverse pin connector on the front end of said cylinder, a pair of substantially parallel thrust reaction arms on opposite sides of said cylinder, said arms being connected at their rear ends with the inner ends of said bearing tubes and connected at their front ends with said pin connector, a hanger arm connected at one end with said pin connector, and a chassis mounting bracket pivotally connected with the opposite end of said hanger arm.

References Cited by the Examiner

UNITED STATES PATENTS

| 1,633,104 | 6/27 | Johnson | 298—38 |
| 2,635,004 | 4/53 | Shadwick | 298—22 |

FOREIGN PATENTS

| 159,820 | 1/33 | Switzerland. |
| 948,778 | 2/49 | France. |

ARTHUR L. LA POINT, *Primary Examiner*.
RALPH D. BLAKESLEE, *Examiner*.